United States Patent [19]

Bertelsbeck

[11] 4,363,940

[45] Dec. 14, 1982

[54] ELECTRICALLY DRIVEN RAIL OR TRACK BOUND VEHICLE

[75] Inventor: Helmü Bertelsbeck, Stuttgart, Fed. Rep. of Germany

[73] Assignee: Daimler-Benz Aktiengesellschaft, Stuttgart, Fed. Rep. of Germany

[21] Appl. No.: 243,619

[22] Filed: Mar. 13, 1981

[30] Foreign Application Priority Data

Mar. 13, 1980 [DE] Fed. Rep. of Germany ....... 3009653

[51] Int. Cl.³ ............................................... B60L 5/06
[52] U.S. Cl. ...................................... 191/59.1; 191/66
[58] Field of Search ........................... 191/59.1, 66–70, 191/78, 47

[56] References Cited

U.S. PATENT DOCUMENTS 3,068,330 12/1962 Suberkrub ...................... 191/59.1 X
3,123,191 3/1964 Sprigings ........................ 191/59.1 X

*Primary Examiner*—Richard A. Schacher
*Attorney, Agent, or Firm*—Paul M. Craig, Jr.

[57] ABSTRACT

An electrically driven rail or track bound vehicle which can be supplied with electrical power from an overhead wire. The vehicle includes a current collector carrying at least one bow trolley, with the current collector being adjustable to varying levels. A width of the bow trolley is automatically variable in such a manner that, with the current collector being adjusted to a low level, the bow trolley is narrow and with the current collector being adjusted to a high level, the bow trolley has a wide width. The width of the bow trolley is variable continuously with height variations of the current collector.

5 Claims, 4 Drawing Figures

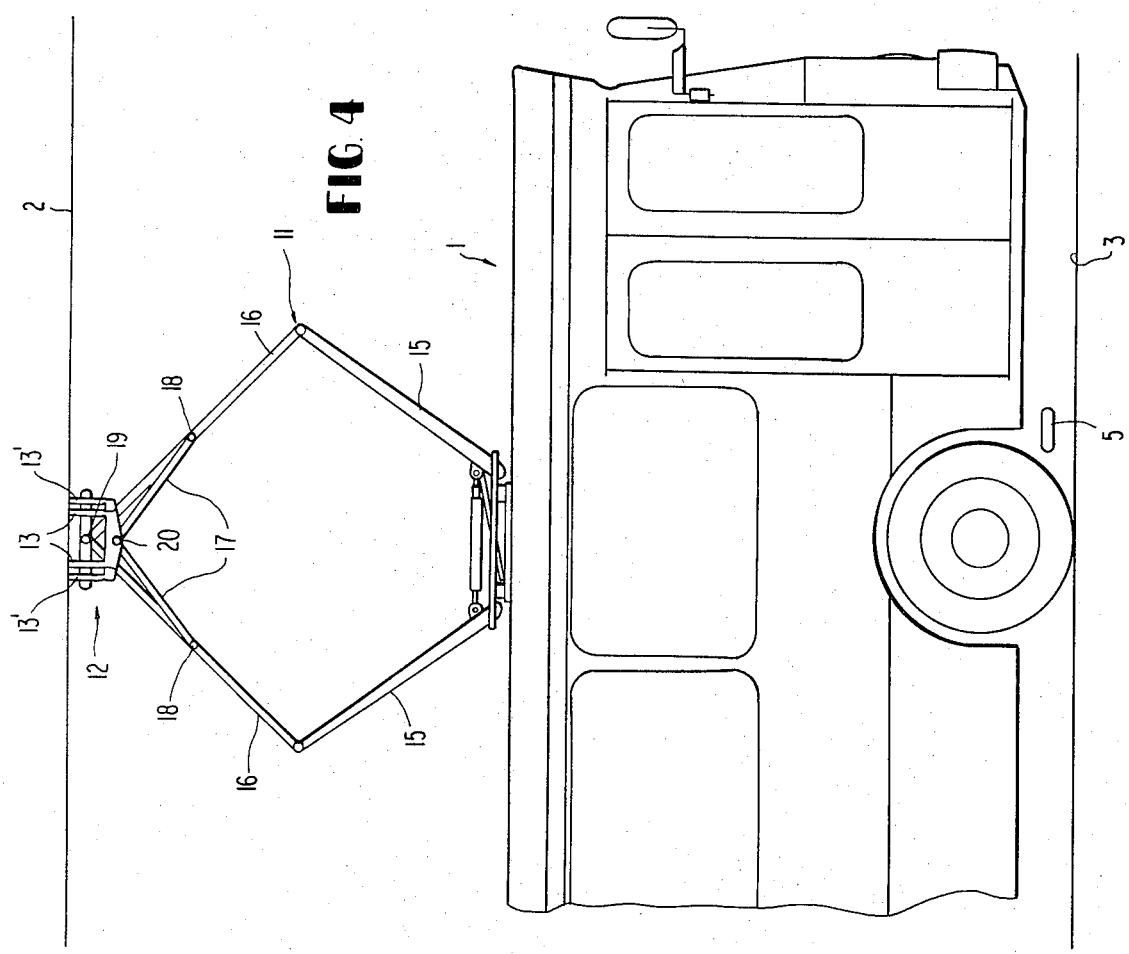
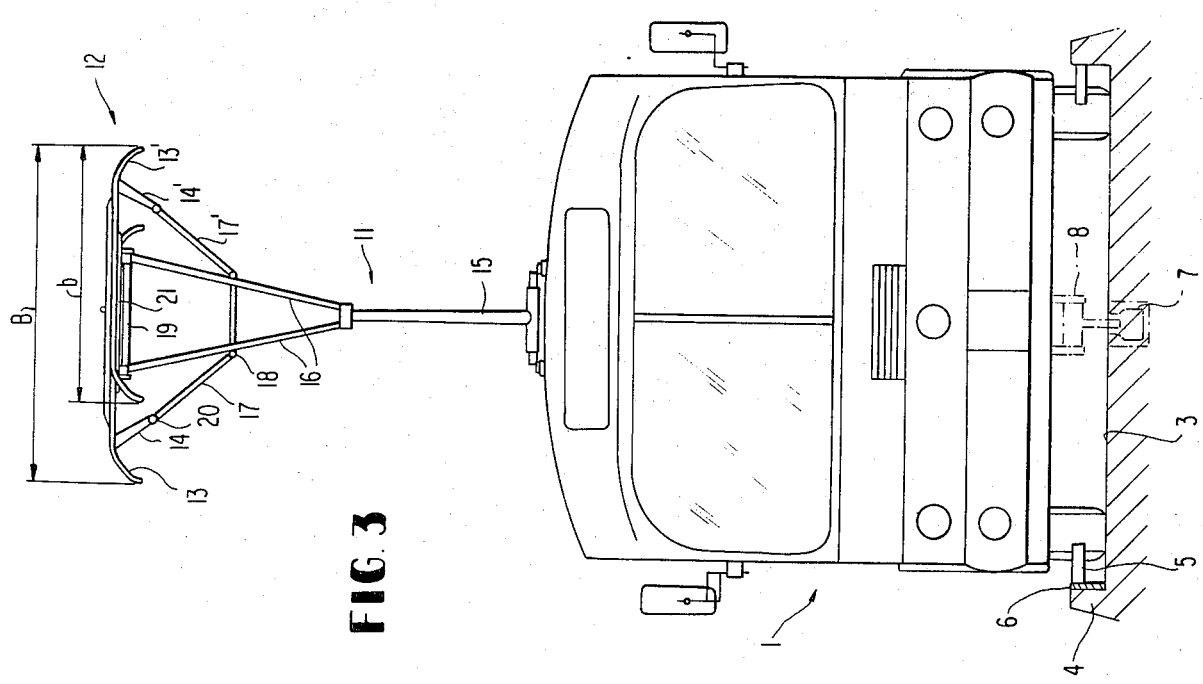

ELECTRICALLY DRIVEN RAIL OR TRACK BOUND VEHICLE

The present invention relates to a vehicle and, more particularly, to an electrically driven rail or track bound vehicle such as, for example, a so-called subway trolley car generally used in metropolitan areas for public transportation.

Electrically driveable rail or track bound vehicles have been proposed wherein electric power to an electrical drive means is supplied from an overhead wire, with a current collector carrying at least one bow trolley which is adjustable to varying levels or heights.

For financial reasons, it is desired to minimize cross sections of underground tunnels used for public local transportation systems. Normal rail or track bound vehicles with wheel trucks or boggies have a greater structural height than conventional rubber tire buses and, for this reasons, it has been proposed to provide an electrical drive means for rubber-tired buses and to supply the buses with energy from overhead by a trolley wire since vehicles of such type would offer possibilities for reducing and minimizing the tunnel cross sections in subway systems for a metropolitan area.

By equipping buses of the aforementioned type with suitable conventional transverse guiding systems, it is possible to operate the buses in a rail or track bound mode with a neutral feeder for the energy supply being installed along the roadside as with conventional rail or track bound vehicles. In such a situation, it is merely necessary to install a single overhead line which may be safely contacted by a bow trolley or sliding bowl.

In order to more fully consider the feasibility of utilizing rubber tired vehicles for subway systems, cost studies were conducted and it was determined that a circular tunnel profile with an inside diameter of 4.4 m is not only adequately large enough to accommodate the vehicle, the overhead power line, and to provide an escape margin, but also tunnel profiles of such dimensions can be produced by means of time and cost-saving construction methods such as, for example, by hydraulic rough pressing of prefabricated reinforced concrete tubes.

In actual practice, a relatively small tunnel of a circular profile requires a narrow bow trolley at the current collector since otherwise, with the extreme lateral displacement and extreme wobbling motion of the vehicle, there is a danger of the vehicle colliding with the wall of the tunnel. However, a disadvantage of a narrow bow trolley resides in the fact that when such vehicles are operated in a rail or track bound operation over above ground public roads, the width of the bow trolley is too small since, on public roads, the overhead wires must be installed at a height of at least 5 m so that trucks can safely pass thereunder and, at a height of at least 5 m, wobbling motions of the vehicle fed from the overhead wire lead to considerable lateral displacement of the bow trolley. Thus, for use above ground on public roads in a rail or track bound mode of operation, a relatively wide bow trolley is required. Furthermore, for reasons of wear and tear, a slightly zig-zag shaped course of the overhead wire is required thereby further increasing the required width for the bow trolley. However, a wide bow trolley could not be used in the circular tunnels without the danger of lateral collisions of the vehicle with the wall.

The aim underlying the present invention essentially resides in providing an electrically driveable rail or track bound vehicle which may be supplied from overhead wires wherein a current collector is provided with at least one bow trolley which is narrow enough to be utilized in tunnels of relatively small cross section and which is adjustable so as to be wide enough to enable use of the vehicle for a track or rail bound operation above ground on normal public roads.

In accordance with advantageous features of the present invention, the bow trolley is automatically variable in such a manner that with a current collector adjusted to a low level or height and with the current collector at a high level or height, the bow trolley width is varied. By virtue of the variability in the width of the bow trolley, the bow trolley can be automatically adapted to the respective requirements with the current collector at the low level or extended high level position.

Advantageously, in accordance with the present invention, a drive means for changing the width of the bow trolley may be derived from a displacement motion of the current collector.

Preferably, the width of the bow trolley is continuously variable with variations in the height of the current collector.

Advantageously, each bow trolley consists of a pair of individual bows arranged in a side-by-side relationship which are movably guided at right angles to a driving direction of the vehicle, with each of the bows being provided with a displacement drive mechanism.

The current collector, in accordance with the present invention, has a pantograph-like construction with a displacement drive for the individual bows being derived from arms of the pantograph forming the current collector.

Advantageously, the derived displacement drive essentially consists of a pair of push rods forming an articulated triangle, with the push rods being articulated with their mutual facing ends respectively about the same location lying below a point of articulation of the upper pantograph arms of the bow trolley to one of the individual bows and being articulated with their respectively other ends to one of the two upper pantograph arms of the current collector.

Accordingly, it is an object of the present invention to provide an electrically drieable track or rail bound vehicle which avoids, by simple means, shortcomings and disadvantages encountered in the prior art.

Another object of the present invention resides in providing an electrically driven track or rail bound vehicle which may be readily operated in tunnels of relatively small cross sectional areas as well as above ground road surfaces.

Yet another object of the present invention resides in providing an electrically driven track or rail bound vehicle which minimizes if not avoids the occurence of wall collisions of the vehicle when the vehicle is operated in a tunnel of a relatively small cross section.

A further object of the present invention resides in providing an electrically driven track or rail bound vehicle having a bow trolley which is automatically varied in dependence upon an operation of the vehicle in either a tunnel or on a above ground road surface.

A still further object of the present invention resides in providing an electrically driven rail or track bound vehicle which includes a bow trolley which is simple in construction and therefore relatively inexpensive to manufacture.

Yet another object of the present invention resides in providing an electrically driven motor vehicle which functions realiably under all operating conditions.

These and other objects, features and advantages of the present invention will become more apparent from the following description when taken in connection with the accompanying drawings which show, for the purposes of illustration only, one embodiment in accordance with the present invention, and wherein:

FIG. 3 is a front view of an electrically driven vehicle constructed in accordance with the present invention travelling above ground with a current collector adjusted at a high level; and FIG. 4 is a side view of the vehicle of FIG. 3.

Figure 1:
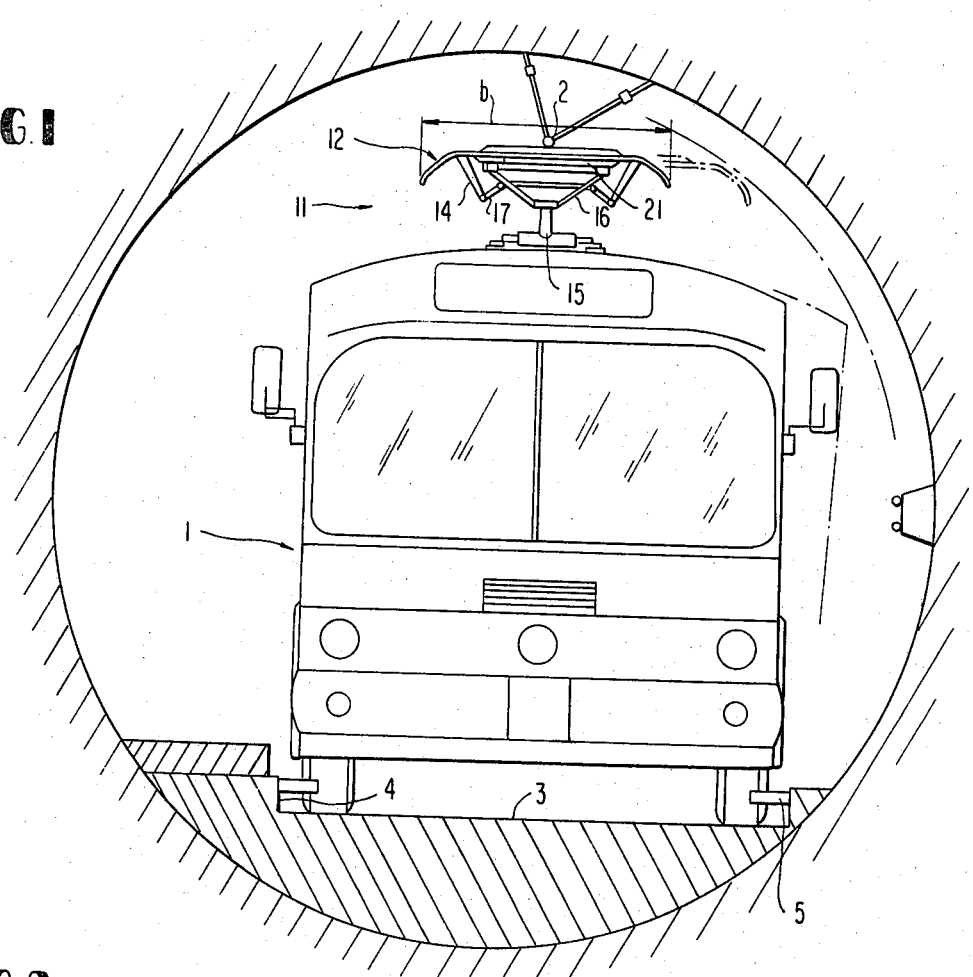
FIG. 1 is a frontal view of an electrically driven vehicle constructed in accordance with the present invention travelling in a tunnel zone with a current collector of the vehicle at a low level adjustment.
Figure 2:
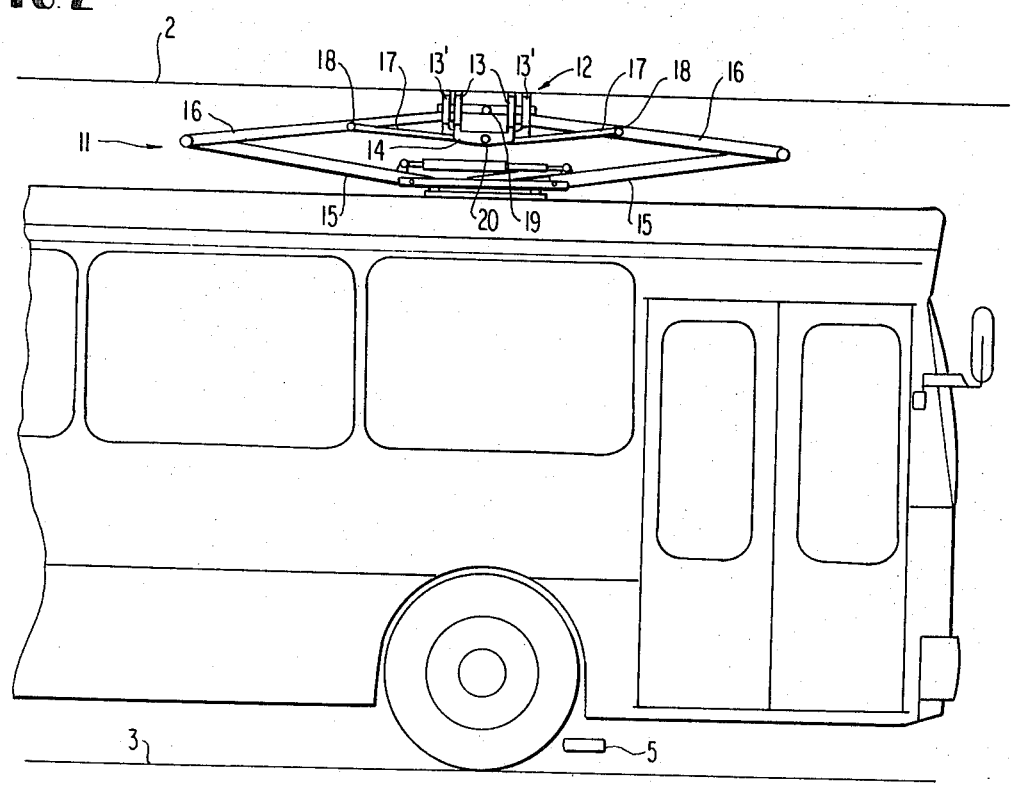
FIG. 2 is a side view of the vehicle of FIG. 1.

Referring now to the drawings wherein like reference numerals are used throughout the various views to designate like parts and, more particularly, to FIGS. 1 and 2, according to these Figures, a vehicle generally designated by the reference numeral 1 is constructed as a bus which is adapted to be electrically driven, with energy for the electrical drive being supplied from an overhead wire 2 and a level-variable current collector generally designated by the reference numeral 11. The vehicle 1 is adapted to travel in a rail or track bound operation along a lane 3 provided with track-determining transverse guide ridges or rails 4. The guide ridges or rails 4 cooperate with transverse guide rollers 5 mounted along the side of the vehicle 1 in a conventional manner.

As shown in FIG. 3, a neutral feeder 6 is mounted to at least one of the transverse guide ridges 4. In areas of roadway overlappings, such as, for example, switches or intersections of tracks of the same kind or of intersections with normal roadways of general traffic, the transverse guide ridge 5 is not provided and, for this purpose, an auxiliary transverse guidance system is employed for driving along public roads where the transverse guide ridges are not provided. The auxiliary transverse guidance system includes a track groove 7 provided on a side of the roadway and a preferably retractable follower member disposed on the vehicle. The track groove 7 may likewise takeover the function of the neutral feeder 6.

The current collector 11 includes a pair of lower pantograph arms or scissor legs 15 and a pair of upper pantograph arms or scissor legs 16 arranged in a mirror image symmetry to each other and carrying a bow trolley generally designated by the reference numeral 12 at a point of articulation of the upper pantograph arm 16. The pantograph arms are conventionally provided with a drive mechanism (not shown) for urging the current collector against the overhead wire 2. Due to the vertical variability of the current collector, a safe contact with the overhead wire 2 can be established even with a relatively low level of the installed overhead wire 2 in, for example, a tunnel area.

Considering operation of the vehicle 1 within a tunnel, the bow trolley has a relatively narrow width of b while the current collector operates at a low level adjustment. The dimension b is selected so that, based upon a maximum lateral displacement of the vehicle 1 plus a maximum possible wobbling motion, illustrated in phantom line in FIG. 1, a sufficiently large safety distance is retained for the voltage bearing parts of the current collector 11 from the wall of the tunnel.

In order to provide for a sufficiently large width for the bow trolley 12 when changng over to routes where the overhead wire 2 is installed at a high level, the bow trolley 12 is automatically variable in width in accordance with the present invention to a larger dimension B. For this purpose, as shown most clearly in FIGS. 3 and 4, individual bows 13, 13', respectively, are arranged in parallel side-by-side relationship in the bow trolley 12, with the bows 13, 13' being movably guided in transverse guides 21 at right angles to a longitudinal direction of the vehicle 1. The individual bows 13, 13', in turn, respectively include two parallel-disposed spaced apart elements which are mechanically and electrically joined by means of connecting brackets 14, 14', respectively.

A drive for the transverse displacement of the individual bows 13, 13' during a vertical adjustment of the current collector 11 is derived from the upper pantograph arm 16, namely, in such a way that, separately for each individual bow 13, 13', two push rods 17, 17', arranged in mutual mirror image symmetry are provided which, with their lower ends, are connected by way of spherical bearings 18 to the upper pantograph arms 16, with mutually facing ends being articulated, likewise by way of a spherical joint, to the associated connecting bracket 14 or 14' at a point of articulation 20.

The point of articulation 20 lies at a vertical spacing below the point of articulation 19 for the upper pantograph arms 16 at the bow trolley 12. By an uprighting movement of the pantograph arms 16 into the position shown in FIG. 4, the distance of the two opposed spherical bearings is reduced whereby a larger dimension is obtained for the triangular height within the articulated triangle formed by the three joints 18, 20, 18 so that, as seen in a frontal view, the point of articulation 20 of the individual bows is shifted during extension of the current collector 11 in a direction toward the outside of the vehicle 1. The telescoped or inwardly pushed individual bows 13, 13' are thus pulled apart telescopically whereby a width of the bow trolley is obtained which is larger in total.

During a retraction of the current collector 11, the triangular height is shortened by stretching of the joint triangle whereby the individual bows 13, 13' are pulled back toward a center of the vehicle 1 until they lie, as viewed in a frontal view, approximately in congruent relationship. The change in the height dimension of the above mentioned joint triangle must not only take place absolutely, rather, a relative change in the dimension of the triangle height must also result as compared to the articulated triangle formed by the points 18, 19, 18. This relative change in the dimension of the triangle height is attained by providing that the point of articulation 20 between the push rod 17, 17' and the connecting bracket 14 or 14' is placed lower in the vertical direction than the point of articulation 19 between the bow trolley 12 and the upper pantograph arm 16. This vertically offset relationship of the two points of articulation 19 and 20 is primarily governed for the transverse displacement path of the individual bows 13, 13' during the vertical adjustment of the current collector 11. It is advantageous, when the current collector 11 is extended, to impart to the bow trolley 12 a maximally large width, i.e., to impart to the individual bows 13, 13' a maximally large displacement path so that a maximally large bow trolley width results. A large bow trolley width permits a great width tolerance of the overhead wire 2 which has a positive effect, for financial reasons, especially along curves because the overhead wire need not be firmly anchored or braced in as many locations.

While I have shown and described only one embodiment in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. An electrically driven track bound vehicle comprising at least one bow trolley means cooperable with an overhead wire for supplying electrical energy to the vehicle, and height adjustable current collector means for carrying the at least one bow trolley means, characterized in that means are provided on the bow trolley means for automatically varying a width of the bow trolley means in response to a height adjustment of the current collector means in such a manner that the bow trolley means has a narrow width with the current collector means in a low position and a wide width with the current collector means at a high position.

2. A vehicle according to claim 1, characterized in that the width varying means for the bow trolley means is continuously variable with height variations of the current collector means.

3. A vehicle according to one of claims 1 or 2, characterized in that the bow trolley means includes a pair of individual bows arranged in a side-by-side relationship and movably guided at right angles to a driving direction of the vehicle, and in that the width varying means for the bow trolley means includes drive means for displacing the individual bows in response to height variations of the current collector means.

4. A vehicle according to claim 3, characterized in that the current collector means includes a plurality of individual arms pivotally connected to each other so as to form a pantograph, and in that the drive means is connected with the arms in such a manner that a driving force for displacement of the individual bows is derived from the arms during a height adjustment of the current collector means.

5. A vehicle according to claim 4, characterized in that upper arms of the current collector means are articulated to the bow trolley means, the drive means includes a pair of push rods forming an articulated triangle, mutually facing ends of the push rod are articulated to the bow trolley means at a single location, the point of articulation of the push rods to the bow trolley means being disposed below the point of articulation of the upper arms of the current collector means to the bow trolley means, and in that opposite ends of the respective push rods are articulated to the upper arms of the current collector means.

* * * * *